Aug. 12, 1969  S. L. SCHULTZ ET AL  3,461,425
DECELERATING AND DISTRESS LIGHT

Filed Nov. 9, 1966  4 Sheets-Sheet 1

INVENTORS
EDWARD R. KERZNAR
SILAS L. SCHULTZ

BY *Malcolm A. Bradway*

ATTORNEYS

INVENTORS
EDWARD R. KERZNAR
SILAS L. SCHULTZ

BY *Malcolm A. Bradway*

ATTORNEYS

Inventors
Edward R. Kerznar
Silas L. Schultz
By Mann, Brown & McWilliams
Attys

United States Patent Office 3,461,425
Patented Aug. 12, 1969

3,461,425
DECELERATING AND DISTRESS LIGHT
Silas L. Schultz, 3854 S. Massachusetts Ave., Milwaukee, Wis. 53220, and Edward R. Kerznar, 11940 W. Cold Spring Road, Greenfield, Wis. 53228
Continuation-in-part of application Ser. No. 408,083, Nov. 2, 1964. This application Nov. 9, 1966, Ser. No. 598,581
Int. Cl. B60q 1/30
U.S. Cl. 340—71                                    9 Claims Our invention relates to decelerating and distress signals, and more particularly to light signals for automotive vehicles.

It is apparent to anyone familiar with the driving of an automotive vehicle that the hazard of "rear end" collisions is increasing daily, especially on tollways and freeways due to the large number of vehicles in transit and the high speeds involved. The hazard occurs when a vehicle suddenly decelerates, or when a vehicle is stopped on the highway.

The major purpose of our invention is to provide a light signal system which is so formed that it will actuate lights for a predetermined length of time when a vehicle is being decelerated to indicate to the driver in a following vehicle that the first vehicle is about to come to a halt or is slowing down, together with flasher lights to indicate that the driver of the vehicle is in distress.

A related purpose of the invention is to provide a device that employs a delayed action switch for the actuation of the device and to operate the switch directly from the accelerator or the linkage arrangement therefor leading to the carburetor.

Still another purpose of our invention is to provide a device of the character described that is operated by the current controlled by the ignition switch of the automotive vehicle.

Other and further objects of our invention will become more apparent as the description proceeds, when taken in conjunction with the accompanying drawings, in which.

Figure 1:
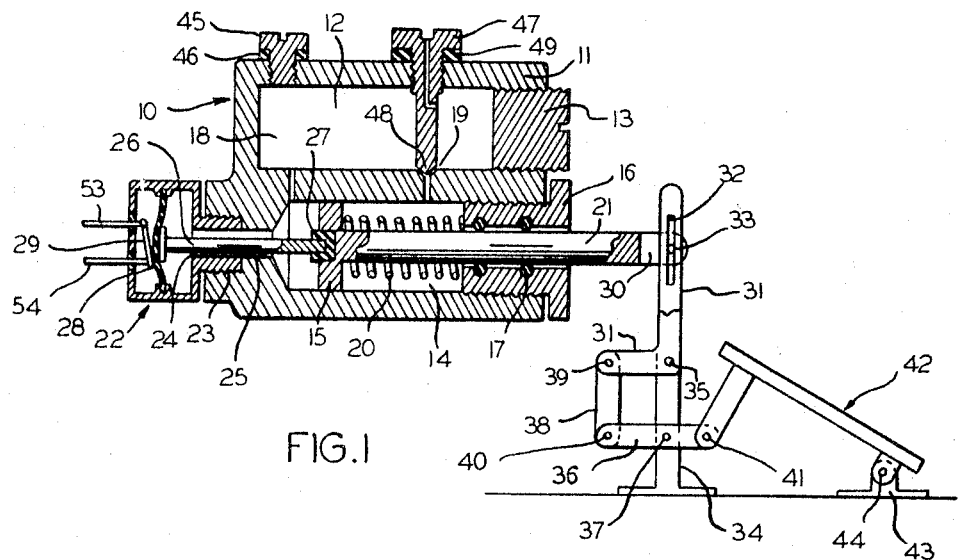
FIGURE 1 is a vertical cross sectional view of a delayed action decelerating unit assembly for making switch contacts when the pressure on an accelerator pedal is released.
Figure 2:
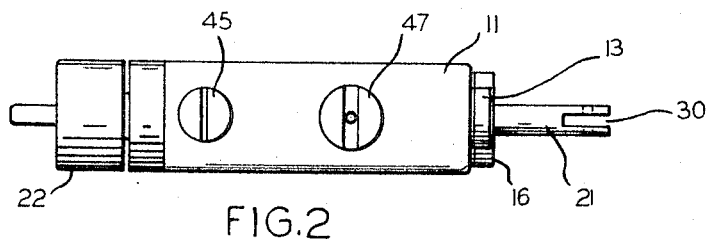
FIGURE 2 is a top view of the device shown in FIGURE 1.
Figure 3:
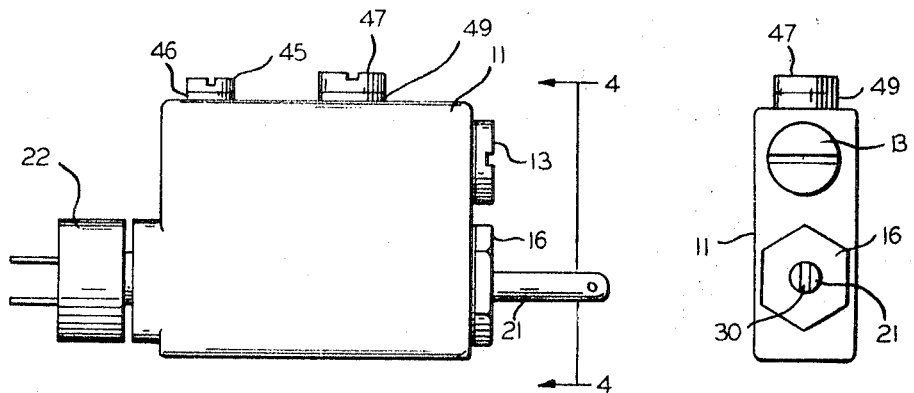
FIGURE 3 is a side view of the delayed action switch assembly shown in FIGURE 1.
Figure 4:
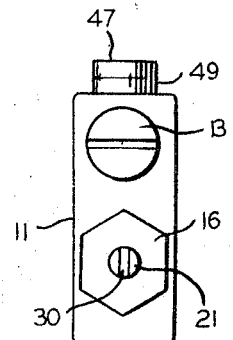
FIGURE 4 is a front view of the switch arrangement taken at a line 4—4 in FIGURE 3.

Similar characters of reference indicate corresponding parts throughout the several views, and referring specifically now to the same, the character 10 (see FIGURE 1) designates generally a delayed action deceleration switch assembly which may be controlled hydraulically or pneumatically. It is adapted to be actuated by the accelerator pedal. It may be disposed anywhere in the linkage train leading from the accelerator to the carburetor, which linkage controls the fuel supply to the engine.

The unit 10 consists of a body 11 constructed of metal, molded plastic or the like, and having a horizontal cylinder 12 open at one end and sealed by means of a conventional plug shown as 13. Another cylinder 14 extends generally parallel with the cylinder 12, and has a piston or plunger 15 disposed therein and slideably supported at an open end of the cylinder 14 in a plug 16 equipped with conventional O-rings 17.

The cylinders 12 and 14 are in communication with one another by a passage 18 on one side of the piston 15, and another passage 19 disposed behind or at the other side of the piston 15. The piston 15 is urged forward toward the passage 18 by a compression spring 20 surrounding the stem 21 of the piston 15 and disposed between the piston 15 and the inner surface of the plug 16.

The forward end of the body 10 has a pressure switch housing 22 of any conventional design and constructed of plastic or the like. It may be threadedly applied to body 10 by means of the threads 23. Switch housing 22 has a tubular opening 24 disposed in alignment with a tubular opening 25 in the forward end of the body 10.

The piston 15 has a contact rod 26 connected in an insulated manner as at 27 to the piston 15 and leading through the openings 24 and 25 for contact with a diaphragm 28 which spans the interior of housing 22. A switch contact making member 29 is responsive to pressure in the housing on the outer side of the diaphragm 28 for closing switch contacts in a circuit which will be described.

The stem 21 of the piston 15 extends outward from the plug 16, and is shown slotted at 30, to embrace a rocker arm lever 31 which has an elongated opening 32 in which a pin 33 pivotally connects it to the stem 21.

A support 34 pivotally supports lever 31 at 35 and another link 36 at 37. Lever 31 and the link 36 are pivotally connected by a member 38 at 39 and 40, respectively. A pivot pin 41 joins the link 36 to a conventional vehicle accelerator pedal 42 which, as shown, is customarily pivoted to the vehicle floor mounting 43 at 44.

The cylinder 12 acts as a pressure equalizing chamber for the fluid in the hydraulic unit. It may have a filler plug 45 threadedly engaging the body 11, and sealed by a washer 46. A vent plug 47 threadedly engages the body 11 and terminates in a conical point 48 for adjustably regulating flow through passage 19.

Vent plug 47 may bear against a washer 49.

The unit 10 may be hydraulic as shown or may be pneumatically controlled. The switch 28 is closed when pedal 42 is in the uppermost position and is normally open when the pedal moves downward or when the pedal is held at positions other than the uppermost position. When pressure on the pedal 42 is released, it will cause the spring 20 to force the plunger 15 forward and with it the contact rod 26 to create pressure to close the circuit making member 28. In the uppermost position of pedal 42, switch 28 is closed due to the positive contact between rod 26, the diaphragm and switch member 29.

When the accelerator pedal 42 is in the uppermost idling position, the parts are as illustrated in FIGURE 1. When the pedal is depressed, piston 15 moves to the right, thus compressing spring 20. When the pedal 42 moves in a decelerating direction, it forces piston 15 to the left and creates pressure to the left of the piston and this pressure flexes diaphragm 28 to the left to create pressure to close the switch. The switch will remain closed until the pressure on the right side of the diaphragm is reduced, as by the action of the pressure equalization passages 18 and 19. Thus, with a slight decelerating motion of pedal 42, the switch will remain closed for only a small instant of time, whereas with the larger decelerating motions, the switch will remain closed for a longer period of time due to the fact that it then takes longer for the pressure to equalize and release the switch.

The switch assembly may be mounted for direct connection with the accelerator pedal 42, or may be inserted anywhere within the linkage connection of the accelerator with the carburetor of the vehicle.

Figure 5:
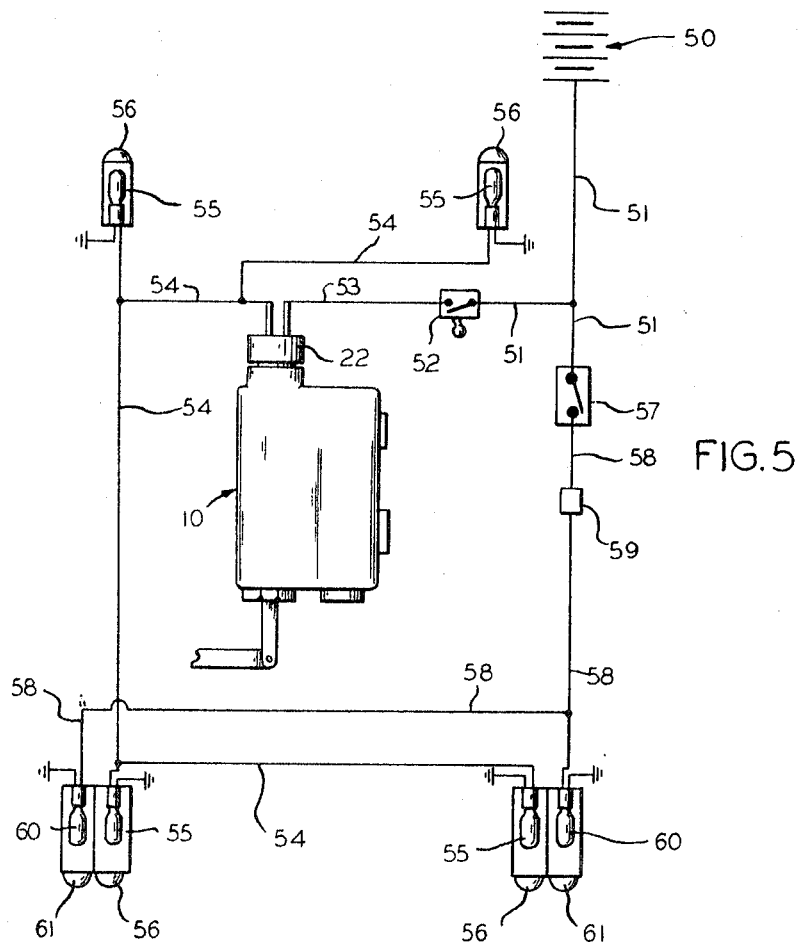
FIGURE 5 is a diagrammatic layout of the circuit.

Referring to FIGURE 5, the source of current in the automotive vehicle is the battery, shown as 50. A current supply line 51 leads to a switch 52, which preferably is the key actuated ignition switch on the instrument panel of the vehicle.

From the switch 52, a line 53 leads to the switch assembly 10. From this switch, a line 54 leads to four lights 55 which are encased and provided with colored lenses 56 (preferably amber), so when the deceleration occurs due to the operator releasing pressure on the accelerator pedal 42, all four (if desired) amber lights are ignited for a predetermined time, as goverened by the switch assembly 10.

By further referring to FIGURE 5, it will be noted that the current supply 51 also leads to a manually operated "snap" switch 57 located at any convenient place on the instrument panel of the vehicle. From switch 57, a current supply line 58 leads to a flasher switch 59, and from it to two lights 60 encased in enclosures equipped with colored lenses (preferably blue) and these two lights 50 act as a distress signal to attract the attention of the patrol car, or anyone willing to render assistance.

Figure 6:
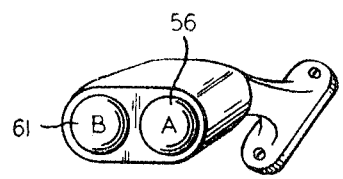
FIGURE 6 is a perspective view of a lamp housing utilized with the system and adapted for attachment to the vehicle body.

The lamps may be mounted on the vehicle in any manner, as for example, in FIGURE 6, wherein a lamp support is illustrated for the blue and amber lenses 61 and 56 on the lamps 60 and 55, respectively.

The motor in the vehicle is accelerated in the usual manner, and when pressure on the accelerator pedal is released, the amber lights will signal for a predetermined period of time advising the driver in the car following that deceleration is taking place, and the driver in the approaching vehicle will slow his speed.

The period of illumination of the decelerating light may be varied by adjusting plug 47.

The flasher arrangement controlled by a manually operated switch on the instrument panel will flash the blue lights to attract attention that the driver in the forward vehicle is seeking assistance.

The arrangement described, illustrated and claimed herein presents a simple inexpensive device that may be manipulated without special mechanical skill, a device that visually informs the driver in the rear that the vehicle ahead is decelerating to a slower speed because of trouble or the like, while enabling the operator of the affected vehicle to flash a trouble light or signal to indicate that he needs assistance.

With the device described, drivers in following vehicles have a positive means of determining what the driver ahead is about to do. As soon as he decelerates his car, following drivers know he is reducing his speed. The red brake lights continue to inform as to any braking action. With the system herein described in use, the warning lights will show that the car ahead has decreased its speed irrespective of brake action, and the car behind will slow down accordingly.

When the decelerating vehicle comes to a stop and the driver needs help, the other lights (for example, blue) will be caused to flash periodically due to actuation of the flasher switch in the circuit and located on the instrument panel of the vehicle where it is easily accessible to the driver. The decelerating light is then on due to the closing of switch 28 and remains on until the accelerator pedal is again depressed.

The lights may be applied to only the rear of the vehicle or to the front and rear thereof.

Figure 7:
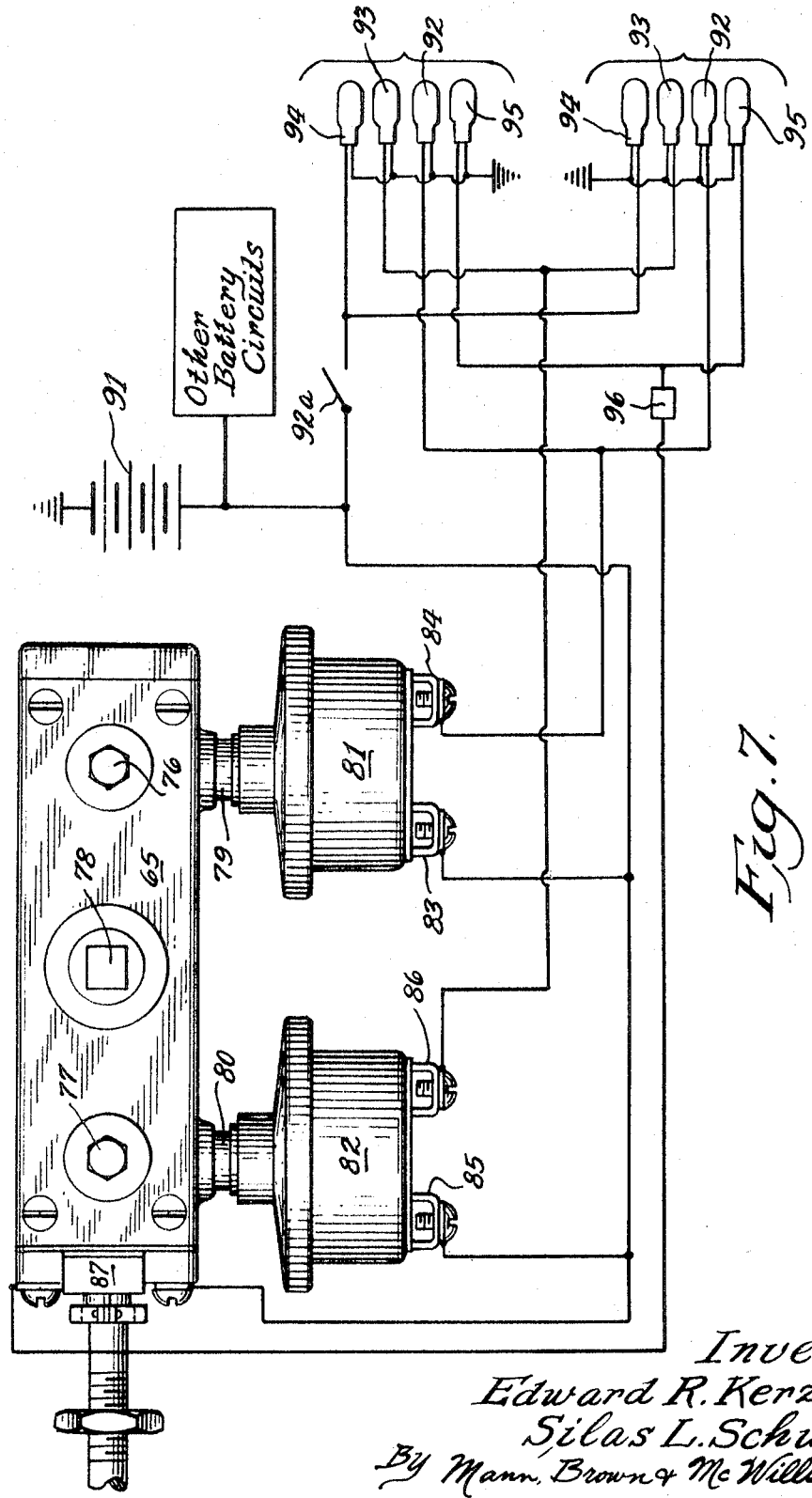
FIGURE 7 is a diagrammatic view of a modified form of the invention.
Figure 8:
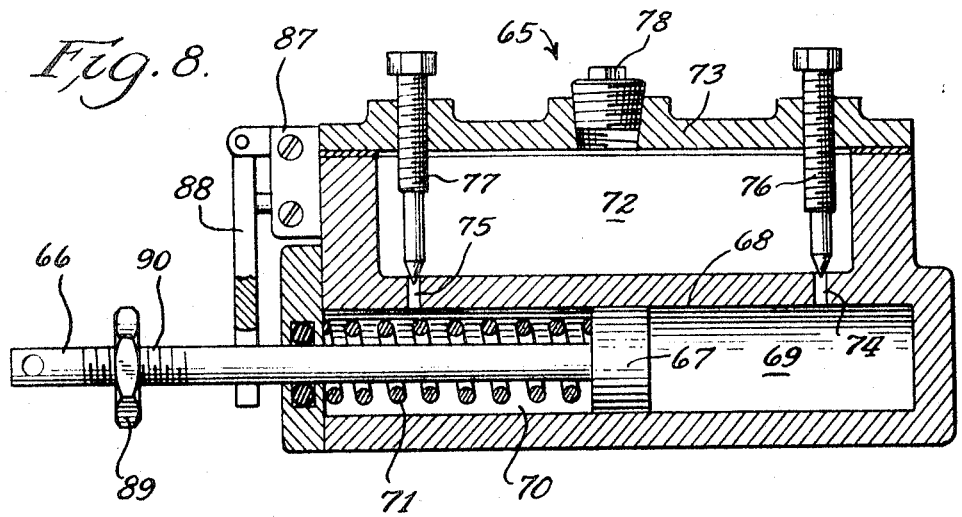
FIGURE 8 is a sectional view of a piston and cylinder assembly illustrated in FIGURE 7.

FIGURES 7 and 8 illustrate a modified from of the invention in which any movement of the accelerator pedal may give an indication of the change of speed of the vehicle. In FIGURES 7 and 8, for example, first circuit means are employed to complete a warning light circuit in response to a decelerating motion of the pedal while second circuit means are employed to energize a different signal light and thus indicate an accelerating motion of the vehicle in which the invention is employed.

In FIGURE 7, the numeral 65 generally designates a piston and cylinder assembly which functions in a manner similar to the piston and cylinder assembly of FIGURE 1. The piston rod 66 is interconnected through a linkage means as in FIGURE 1 to the accelerator pedal so that when the accelerator pedal moves upwardly as in a decelerating motion the piston rod will move to the right. Conversely, as the accelerator pedal moves downwardly as in an accelerating motion the piston rod will be moved by the linkage to the left. Piston rod 66 carries a piston 67 which is slideably mounted for axial movement in a bore 68 of the assembly. The piston 67 serves to divide the bore into a first chamber 69 on one side of the piston and a second chamber 70 on the other side of the piston. A spring 71 may be utilized to bias movement of the piston 67 toward the right as illustrated in FIGURE 8. The assembly includes a fluid reservoir 72 which may be formed in the body which defines the cylinder of the assembly, which reservoir may be open at the top and closed by a cover plate 73. The reservoir 72 is in communication with the chambers 70 and 69 by means of bleed ports 74 and 75 leading to the chambers 70 and 69 at the opposite ends of the bore 68. Needle valves 76 and 77 are adjustably carried by the cover plate 73 and serves to adjustably restrict the bleed ports 74 and 75.

Adjustment of the bleed ports will vary the time interval needed to equalize the pressure in the cylinder after buildup in either chamber thereof. When the piston moves towards the right, pressure will buildup in the chamber 69 until it is gradually released through the bleed port 74. When the piston 67 moves to the left, pressure will build up in the chamber 70 until it is gradually released through the bleed port 75.

A fill plug 78 may be formed in the top plate or cover plate 73 to enable filling of the reservoir 72 and cylinder when hydraulic fluid is used.

Ports are formed through the cylinder wall and lead through fittings 79 and 80 to pressure sensitive switch assemblies generally designated at 81 and 82. These pressure sensitive switch assemblies are of a commercially available type and are adapted to close the contacts thereof upon build up of a predtermined amount of pressure in the assembly. Switch assembly 81, for example, communicates with chamber 69 and has terminals 83 and 84 for completing a circuit when the switch contacts are closed. Switch assembly 82, which communicates with the chamber 70, has terminals 85 and 86 which are connected through the switch contacts so that a ciruit may be completed upon build up of pressure in the switch assembly 82.

Additional switch assembly, which may be of a micro switch variety is designated at 87 and is carried by the body of the assembly on the exterior thereof adjacent to piston rod 66. The switch assembly 87 carries an actuating arm 88 which is adapted to be contacted by an abutment 89 carried by the piston rod in a position where it will contact arm 88 and close switch 87 when the piston has moved to the extreme right hand position which corresponds to a fully up or idling position of the accelerator pedal. Abutment 89 may be adjustably mounted on piston rod 66 by means of a threaded connection therewith as indicated at 90.

In a typical circuit arrangement for the unit illustrated in FIGURES 7 and 8, the pressure switch assembly 81, which is actuated only when the accelerator pedal moves in a decelerating direction closes a circuit leading from a battery 91 to a pair of amber tail lights indicated at 92. The switch assembly 82 is connected through a circuit to additional indicating lights designated 93. These lights 93 are preferably colored green to indicate a "go" or accelerating movement of the accelerator pedal.

The battery 91 is connected through the brake pedal actuated switch 92a to the usual and customary red tail lights 94 of the vehicle.

The warning lights 92 are preferably amber in color to indicate caution due to the decelerating movement of the vehicle.

In the embodiment of FIGURES 7 and 8, switch assembly 87 is connected through a circuit to energize additional lights 95 when the accelerator pedal is at the idling position. The lights 95 are preferably provided with means so that they flash intermittently. Such a flasher switch is indicated in the circuit at 96.

Figure 10:
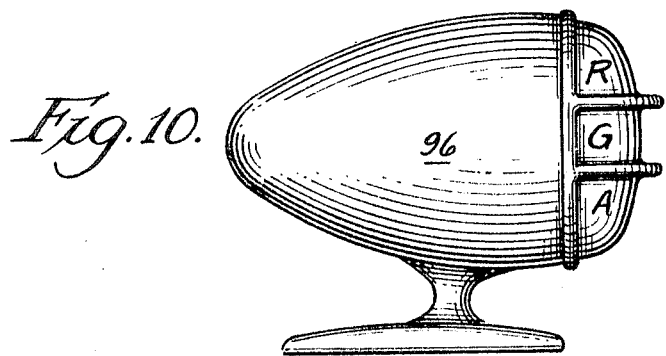
FIGURE 10 is a side view of a typical tail light assembly which may be utilized with the present invention.

In a preferred installation of the lights illustrated in FIGURES 7 and 8, all four of the lights 92, 93, 94 and 95 are carried in a single housing at the rear of the vehicle. Such a housing is illustrated in FIGURE 10. The lens side of the housing 96 is divided into three separate sections which are designated R, G and A, respectively. The top section carries the normal running lights and brake lights 94. The intermediate section designated G carries the lights 93 which when illuminated indicate an accelerating movement of the vehicle. The lower section, which is designated A carries the lights 92 and 95 which are amber in color to indicate caution due to a decelerating movement of the vehicle and/or an idling position of the accelerator pedal. The idling position is indicated by the flashing amber lights and as thus used will indicate a caution signal either while the vehicle is at rest or when the vehicle is slowing down drastically as when preparing for a stop. When the system is thus arranged, a total release of the accelerator pedal will result in an initial amber light indicating caution which is followed by the flashing amber light indicating further caution and followed then by the red brake lights when the operator depresses the brake pedal. Thus, during a normal stopping movement, both the red brake lights and the flashing caution lights will be illuminated.

In lieu of utilizing two separate lamps 92 and 93 for the caution light, a single lamp may be utilized, by using two elements in the bulb. One element is connected to be energized by the pressure switch assembly 81 while the other element thereof is connected to be energized by the contact switch 87.

It should be understood that a tail lamp assembly as illustrated in FIGURE 10 may be utilized at both sides of the rear of the vehicle as indicated by the separated groups of lamps in FIGURE 7.

Figure 9:
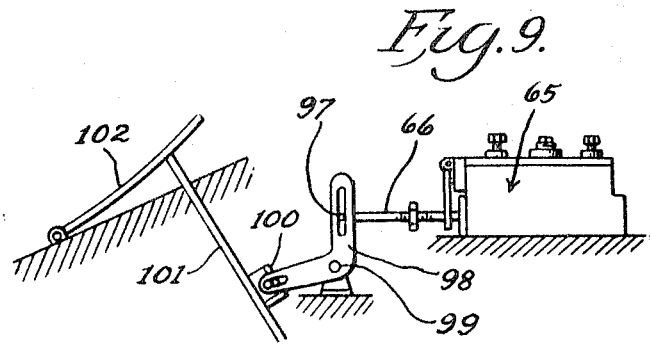
FIGURE 9 is a diagrammatic view of a linkage assembly which may be utilized with the form of invention in FIGURES 7 and 8 or in the form of invention illustrated in FIGURES 1-5, inclusive.

The assembly illustrated in FIGURES 7 and 8 may be connected to an accelerator linkage as illustrated in FIGURE 1 or may be connected as illustrated in FIGURE 9. In FIGURE 9 the housing 65 has the piston rod 66 thereof connected through a pin and slot connection 97 with a crank 98 which is pivotally mounted at 99 on some part of the vehicle. The other arm of the crank is connected through a pin and slot connection 100 with the push rod 101 or other part of the linkage connected with the pivotally mounted accelerator pedal 102.

This is a continuation-in-part of our copending application Ser. No. 408,083, filed Nov. 2, 1964, and now allowed.

We claim:

1. A decelerating warning system for vehicles including circuit means for energization of a warning light, said circuit means including a pressure actuated switch adapted when closed to energize said light, and means for closing said switch in response to decelerating motion of a vehicle accelerator pedal including linkage means interconnected with a vehicle accelerator pedal, a piston and cylinder connected between said linkage means and said switch, said cylinder being connected to pressure responsive means of said switch on one side of the piston in said cylinder whereby a pressure chamber is defined on said side of said piston, said switch being responsive to the pressure in said chamber for closing of said switch in response to a buildup of pressure in said chamber, said cylinder including means for reducing the pressure in said chamber to thereby open said switch after a predetermined time interval following closing thereof, said piston being effective to build up pressure in said chamber during movement of said piston in one direction corresponding to a decelerating motion of said accelerator pedal and being ineffective to build up pressure in said chamber when said pedal moves in the opposite direction.

2. The structure of claim 1 characterized by and including means for holding said switch in a closed position when said linkage means is at a position corresponding to the uppermost position of said accelerator pedal.

3. The structure of claim 1 wherein said means for reducing the pressure in said chamber includes a reservoir in communication with said cylinder on opposite sides of said piston through bleed ports.

4. The structure of claim 3 characterized by and including means for adjustably restricting the flow through at least one of said bleed ports.

5. A change in speed warning system for vehicles including circuit means for energization of a warning light, said circuit means including a pressure actuated switch adapted when actuated to energize said light, and means for actuating said switch in response to a change in speed motion of a vehicle accelerator pedal including linkage means interconnected with a vehicle accelerator pedal, a piston and cylinder connected between said linkage means and said switch, said cylinder being connected to pressure responsive means of said switch on one side of the piston in said cylinder whereby a pressure chamber is defined on said side of said piston, said switch being responsive to the pressure in said chamber for actuation thereof in response to a buildup of pressure in said chamber, said cylinder including means for reducing the pressure in said chamber to thereby deactivate said switch after a predetermined time interval following actuation thereof, said piston being effective to build up of pressure in said chamber during movement of said piston in one direction corresponding to said change in speed motion of said accelerator pedal and being ineffective to build up pressure in said chamber when said pedal moves in the opposite direction.

6. A change in speed warning system for vehicles including first circuit means for energization of a first warning light, second circuit means for energization of a second warning light, each said circuit means including a pressure actuated switch adapted when actuated to energize the light associated with said circuit means, means for actuating one switch in response to a decelerating motion of a vehicle accelerator pedal and actuating the other switch in response to an accelerating movement of said pedal including linkage means interconnected with a vehicle accelerator pedal, a piston and cylinder connected between said linkage means and each said switch, said cylinder being connected to pressure responsive means of one switch on one side of the piston in said cylinder whereby a first pressure chamber is defined on said side of said piston, said cylinder being connected to pressure responsive means of the other switch on the other side of the piston whereby a second pressure chamber is defined on the other side of said piston each switch being responsive to the pressure in its associated chamber for actuation thereof in response to a buildup of pressure in its associated chamber, said cylinder including means for reducing the pressure in each chamber to thereby deactivate each said switch after a predetermined time interval following actuation thereof, said piston being effective to build up pressure in alternate ones of said chambers during movement of said piston in opposite directions corresponding to decelerating and accelerating motions of said accelerator pedal, said piston being ineffective to build up pressure in one chamber while pressure is built up in the other chamber.

7. The structure of claim 6 wherein said means for reducing the pressure in said chamber includes a reservoir in communication with said cylinder on opposite sides of said piston through bleed ports.

8. The structure of claim 7 characterized by and including means for adjustably restricting the flow through at least one of said bleed ports.

9. The structure of claim 6 including means for closing the circuit associated with the decelerating motion of the pedal when the pedal is at an idling position.

References Cited

UNITED STATES PATENTS

| 2,219,351 | 10/1940 | Worrall | 340—71 |
| 3,213,417 | 10/1965 | Lewus | 340—262 |
| 3,359,540 | 12/1967 | Dunavan | 340—72 |

JOHN W. CALDWELL, Primary Examiner

H. COHEN, Assistant Examiner

U.S. Cl. X.R.

200—61, 82; 340—262